United States Patent
Bachmann

(10) Patent No.: US 7,708,293 B2
(45) Date of Patent: May 4, 2010

(54) INDIVIDUAL WHEEL DRIVE FOR INDIVIDUALLY SUSPENDED WHEELS OF A MOTOR VEHICLE

(75) Inventor: Max Bachmann, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 466 days.

(21) Appl. No.: 11/815,344

(22) PCT Filed: Mar. 6, 2006

(86) PCT No.: PCT/EP2006/002028

§ 371 (c)(1),
(2), (4) Date: Aug. 2, 2007

(87) PCT Pub. No.: WO2006/094740

PCT Pub. Date: Sep. 14, 2006

(65) Prior Publication Data

US 2008/0139324 A1    Jun. 12, 2008

(30) Foreign Application Priority Data

Mar. 8, 2005   (DE) ...................... 10 2005 010 515

(51) Int. Cl.
*B60G 9/00* (2006.01)
(52) U.S. Cl. .................. 280/124.156; 280/124.148; 280/5.524
(58) Field of Classification Search .......... 280/124.156, 280/124.146, 124.159, 124.17, 124.171, 280/124.148, 5.524, 5.521, 5.52, 5.515
See application file for complete search history.

(56) References Cited

U.S. PATENT DOCUMENTS

| | | | | |
|---|---|---|---|---|
| 4,765,647 A * | 8/1988 | Kondo et al. | ........... | 280/124.128 |
| 5,230,529 A * | 7/1993 | Harvey-Bailey | ......... | 280/5.508 |
| 5,577,771 A * | 11/1996 | Lee | ........................... | 280/5.52 |
| 6,241,262 B1 * | 6/2001 | Suess | ...................... | 280/5.522 |
| 7,413,203 B2 * | 8/2008 | Kurata | ................. | 280/124.156 |

FOREIGN PATENT DOCUMENTS

| | | |
|---|---|---|
| DE | 91751 | 8/1972 |
| DE | 31 13 949 A1 | 10/1982 |

(Continued)

*Primary Examiner*—Hau V Phan
(74) *Attorney, Agent, or Firm*—Davis & Bujold, P.L.L.C.

(57) ABSTRACT

This invention relates to individual wheel drives for individually suspended, spring-mounted wheels of a vehicle comprising one universal joint shaft (2) connecting the output shaft socket (10) of a drive device with the input shaft socket of a wheel, having one main section (4) and at least one end section (8) situated on one end thereof, via a universal joint (6), rotatingly coupled with the associated shaft socket (10), the universal joint shaft (2) having a permanent inclination which compensates an offset between drive device and wheel, and means being provided for reducing a permanent deviation defined by the inclination. The end section (8) associated with the universal joint (6) and the shaft socket (10) coupled therewith are coupled with each other via a bevel wheel pair (16, 18), the deflection angle α of which corresponding at least partly with the corresponding permanent deflection angle between universal joint shaft (2) and shaft socket (10).

7 Claims, 3 Drawing Sheets

FOREIGN PATENT DOCUMENTS

| | | |
|---|---|---|
| DE | 32 04 246 A1 | 8/1983 |
| DE | 36 29 297 A1 | 4/1987 |
| EP | 0 047 942 | 3/1982 |
| FR | 2 680 733 | 3/1993 |
| FR | 2 726 231 | 5/1996 |
| GB | 151035 | 9/1920 |
| GB | 347104 | 4/1931 |
| GB | 2 087 327 A | 5/1982 |
| GB | 2 181 516 A | 4/1987 |

* cited by examiner

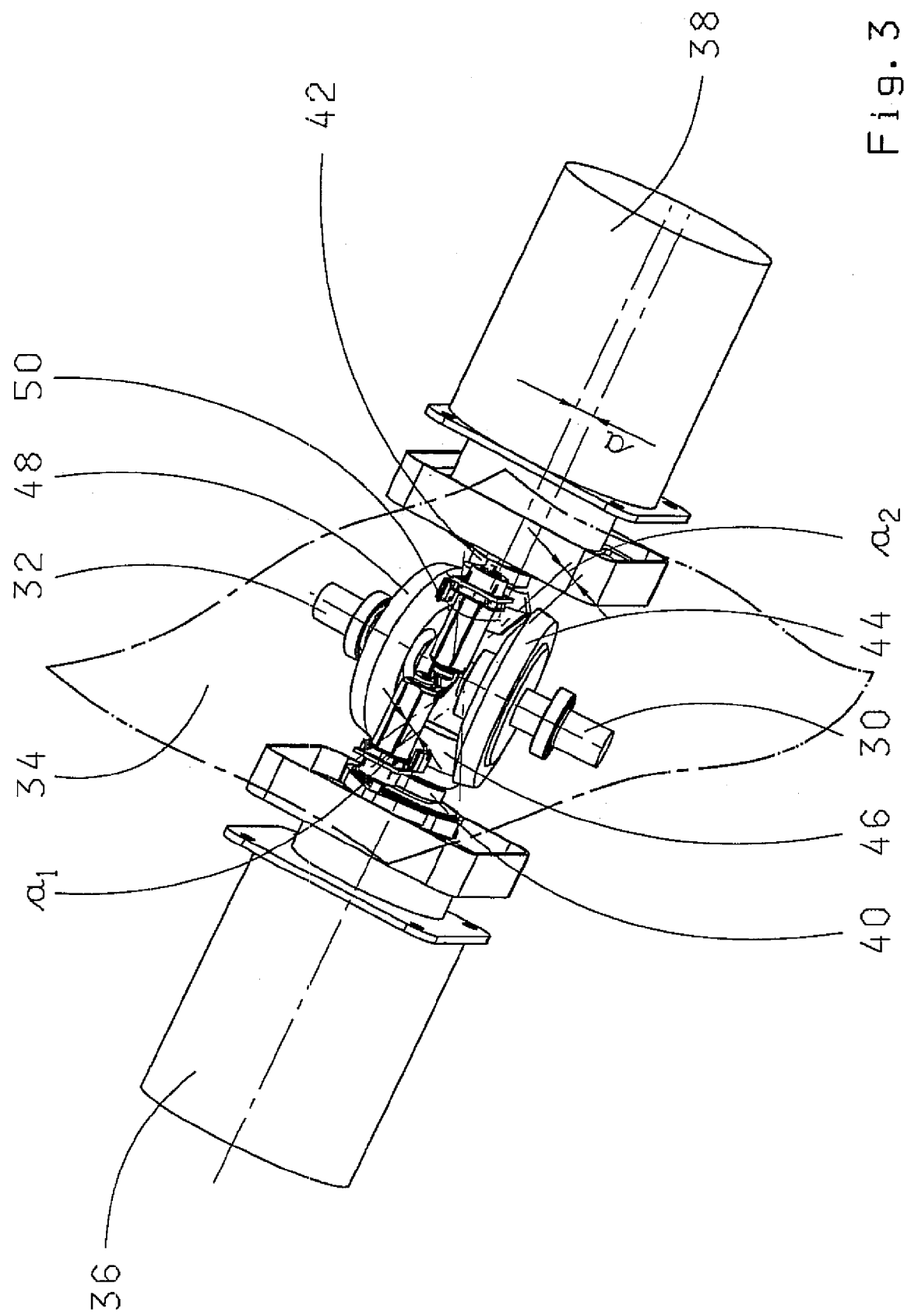

INDIVIDUAL WHEEL DRIVE FOR INDIVIDUALLY SUSPENDED WHEELS OF A MOTOR VEHICLE

This application is a national stage completion of PCT/EP2006/002028 filed Mar. 6, 2006, which claims priority from German Application Ser. No. 10 2005 010 515.7 filed Mar. 8, 2005.

FIELD OF THE INVENTION

The invention relates to an individual wheel drive for individually suspended, spring-mounted wheels of a vehicle.

BACKGROUND OF THE INVENTION

Universal joint shafts permit the movement of a springly suspended wheel relative to a drive device, which is fixedly inserted in the vehicle and can be a prime mover or a transmission situated downstream of the prime mover. During the movement of the axis of rotation of the springly suspended wheel, the universal joint, located at the ends of the universal joint shaft and transmitting the input torque, are subjected, regarding size and direction, to different deflection angles, thus representing specially loaded construction elements. Therefore, the deflection angles are generally structurally limited for protection of the joints against damage or wear.

In numerous applications, a permanent offset exists, between the drive device and the wheel, which has to be compensated by an adequate permanent inclination of the universal joint shaft. Such an offset generally exists in large wheels and low lying central transmissions or in small wheels and elevated central transmission, especially in cross-country vehicles where a large bottom clearance is required for the drive device, such as a differential. The permanent inclination of the universal joint shaft cannot be compensated for, via an adequately large deflection angle of the universal joint, as such the admissible deflection angle is generally exceeded by the superimposition of the largest total deflection angle determined by the elastic movement of the wheels and by the permanent inclination of the universal joint shaft. Therefore, constructions have already become known with which the permanent deflection angle of a universal joint determined by the inclination can be reduced at least partly.

DE 36 29 297 C2 discloses an individual drive in which the universal joint arrangements, provided at both ends of the universal joint shaft, are designed as double joint, i.e., each two individual joints are consecutively disposed in a row. In this manner, the total deflection angle divides between two joints so that the deflection angle of each individual joint can be halved. But such a constructional and structural arrangement involves great expense and is therefore costly. Besides, it also is not to be ruled out in such an arrangement that the deflection angle of each individual joint be so large as to make the service life uneconomical.

Considering this background, the problem is based on creating an individual wheel drive where the permanent deflection angle of a universal joint determined by a permanent inclination of the universal joint shaft can be extensively or completely reduced with simple practical means.

SUMMARY OF THE INVENTION

The invention is based on the knowledge that the deflection angle, determined by the permanent inclination of the universal joint shaft, is a constant angle and, therefore, can be bridged by a constant deflection substantially corresponding to the angle between the universal joint shaft and the connection shaft to be connected therewith.

Accordingly, the invention departs from an individual wheel drive for individually suspended, spring-mounted wheels of a vehicle comprising a universal joint shaft connecting the output connection shaft of a drive device with the input connection socket of a wheel, having a main section and two end sections, each situated on the ends, via a universal joint, and rotatably coupled with the associated connection shaft. The universal joint shaft has a permanent inclination compensating for an offset, between drive device and wheel, means being provided for reducing a permanent deflection angle of a universal joint, determined by the inclination.

It is, in addition, provided for solving the stated problem that the end section, associated with the respective universal joint and the connection shaft coupled therewith, is coupled with each other, via a bevel wheel pair, the deflection angle thereof corresponds, at least in part, to the corresponding permanent deflection angle between the universal joint shaft and the connection shaft to be connected therewith.

In this manner, the permanent deflection angle can be partly or entirely bridged so that the associated universal joint has to reduce only once, the changing deflection angle determined, for example, by the springy movement of the wheel and is generally within the functional limits of conventional universal joints.

According to a structural development of the invention, it is provided for the connection shaft to be located perpendicular to the inclination plane of the universal joint shaft; the deflection angle of the bevel wheel pair amounting to 90 degrees. In such an arrangement, the universal joint shaft can assume any arbitrary position in the inclination plane such that any inclinations are possible.

In many application, it is only possible or necessary for constructional reasons to couple, for example, the drive-side end section of the universal joint shaft, via a deflection angle, reducing bevel wheel pairs with the associated connection shaft. An example of this will be shown and described below with reference to an embodiment.

In a case that is especially typical, meaning occurring frequently, both individual wheels of a wheel pair are spring-mounted supported in a vertical transverse plane of the vehicle and downwardly offset relative to the drive devices situated in the center. According to another embodiment of the invention, in such a case, it is provided that the universal joint shafts, associated with both wheels, are situated in a common transversal plane, lying across the vehicle longitudinal axis and symmetrical, relative to a vertical longitudinal central plane of the vehicle; the same as outwardly and downwardly inclined, and that the output connection shaft of the associated drive devices or the bevel wheels placed thereon are positioned offset in longitudinal direction to the vehicle; that only one of the bevel wheels meshes with the universal-side bevel wheel connected therewith.

Each drive device can be an electric motor electrically connected with one diesel electric drive line.

The inventive construction also permits disposing several pairs of drive wheel in longitudinal direction of the vehicle as still more precisely shown with the aid of an embodiment.

BRIEF DESCRIPTION OF THE DRAWINGS

The invention will now be described, by way of example, with reference to the accompanying drawings in which:

FIG. 3 is a perspective topview of two individual wheel drives for both wheels of a wheel pair.

DETAILED DESCRIPTION OF THE INVENTION

Figure 1:
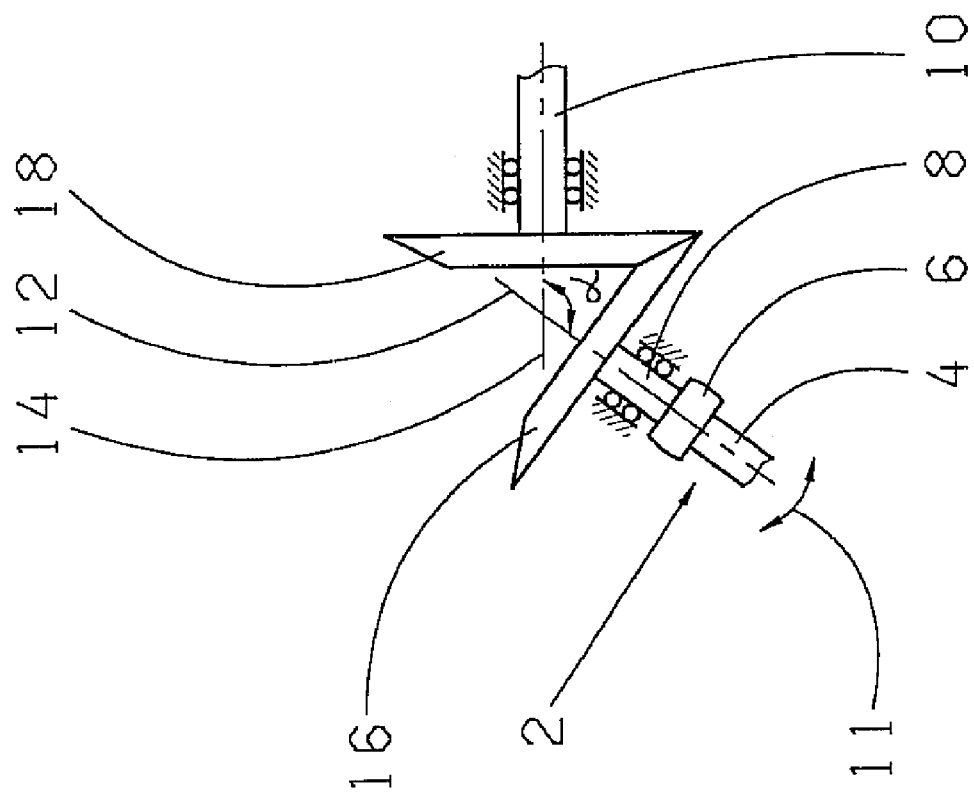
FIG. 1 is a schematic bevel wheel pair for coupling the end section of a universal joint with an output or input connection shaft, the deflection angle of the bevel wheel pair lying in the inclination plane of the universal joint shaft.

FIG. 1 schematically shows an arrangement where one universal joint shaft 2 is diagonally placed in an inclination plane which, in this embodiment, corresponds to the drawing plane so as to ridge an offset existing in this plane, between a drive device 60 and a wheel 62 of the vehicle. A main section 4 of the universal joint shaft 2 is connected, via a universal joint 6, with an end section 8 rotatably mounted in the vehicle body or in the vehicle chassis.

An output connection shaft 10 of a drive device 60 is, likewise, located in the inclination plane of the universal joint shaft 2 and rotatably mounted in the body. An axis of rotation 12 of the end section 8 and an axis of rotation 14 of the connection shaft 10 define an angle α with each other determined by the permanent inclination of the universal joint shaft 2 relative to the horizontal connection shaft 10.

The universal joint 6 receives variable angles determined by elastic suspension of the wheel 62 and corresponding to a double arrow 11, between the main section 4 and the end section 8, as is generally known and, therefore, need not be described in further detail.

The permanent angle α, between the axes 12 and 14 of the end section 8, on one side, and of the connection shaft 10 on the other, is not accommodated, via a universal joint, but is bridged by a bevel wheel pair. For this purpose, the end section 8, on one side, and the connection shaft 10, on the other, respectively, carry one bevel gearwheel 16 and 18, which are arranged to engage. The deflection angle of the bevel gearwheels 16 and 18 corresponds to the angle α. In this manner, the constant angle determined by the permanent inclination of the universal joint shaft 2 is bridged, via a bevel wheel pair, so that the universal joint 6 has to only accommodate the changing deflection angles determined by the elastic motion of the wheel.

Figure 2:
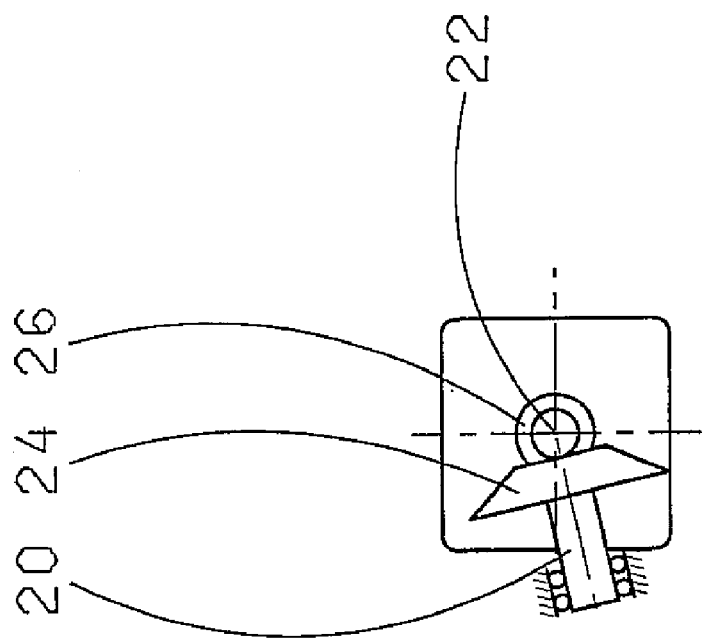
FIG. 2 is another schematic bevel pair, the deflection angle of the bevel wheel pair lying in a plane perpendicular to the inclination plane of the universal joint shaft.

FIG. 2 shows an arrangement where, in turn, an end section 20 operatively connected via a universal joint with a universal joint shaft (not shown) is diagonally placed, in an inclined plane, corresponding to the drawing plane, in order to bridge an offset between a drive device and a wheel. One connection shaft 22 of a drive device 60 is situated perpendicularly to the inclination plane of the universal joint shaft. The end section 20, on one side, and the connection shaft 22, on the other, respectively support a bevel wheel pair 24 and 26. The deflection angle of this bevel wheel pair amounts to 90 degrees. In this case, the deflection angle does not correspond to the inclination angle: the latter can, on the contrary, be arbitrarily selected in the inclination plane by turning the axis of rotation of the connection shaft 22 around.

FIG. 3 shows individual wheel drives for two wheels of a wheel pair. Both end sections 30 and 32 are respectively connected with the associated wheels, universal joint shaft (not shown), are in a transverse plane 34 across the vehicle longitudinal axis, at the same time, representing the inclination plane of the universal joint shafts and in the transverse plane 34 are both outwardly and downwardly inclined, as indicated in FIG. 3. Accordingly, the two individual wheel drives correspond to the arrangement of FIG. 2.

Drive devices 36 and 38, which are respectively associated with the end sections 30 and 32, in the embodiment shown, are electric motors electrically connected with a diesel electric drive line (not shown) and disposed so that the output connection shafts 40 and 42 are perpendicular to the transverse plane 34. The end section 30 supports a bevel gearwheel 44, which meshes with a bevel gearwheel 46, situated on the connection shaft 40. The end section 32 correspondingly supports a bevel gearwheel 48 meshed with a bevel gearwheel 50 located upon the connection shaft 42. To keep the bevel wheels 46 and 50 free from the respective non-associated bevel wheels 48 and 44, the drive devices 36 and 38 are offset in transverse direction of the vehicle, for example, by an amount "a" so that between these, a space remains designated in FIG. 3 with a1 and a2, respectively.

As already explained with reference to FIG. 2, the inclination of the end sections 30 and 32 are arbitrarily adjusted by turning the axes of rotation of the associated connection shaft 40 and 42 around, respectively.

Figure 4:
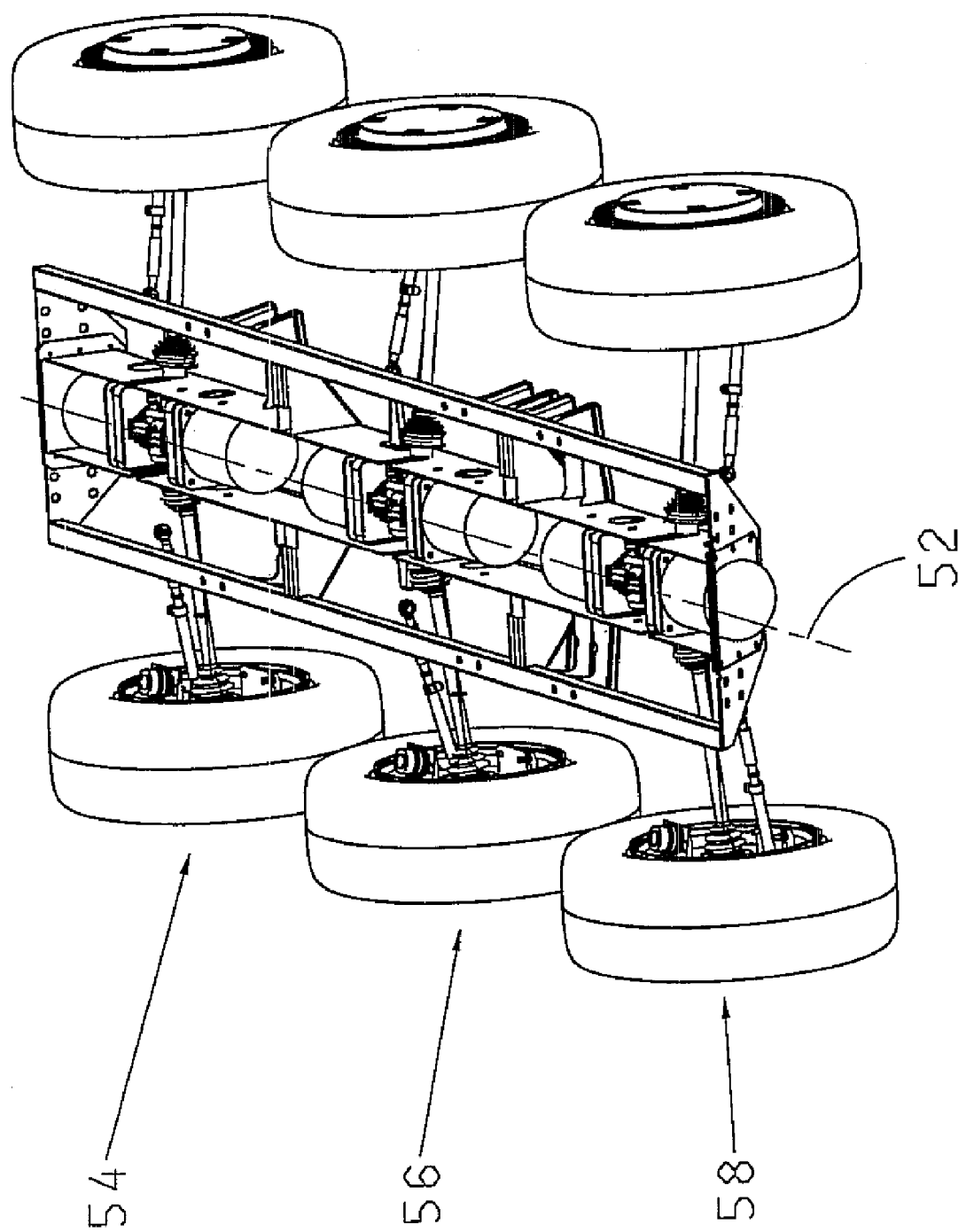
FIG. 4 is a perspective view of a vehicle chassis with three wheel pairs, consecutively disposed in longitudinal direction of the vehicle, each wheel being individually driven.

FIG. 4 shows an embodiment of a vehicle having three pairs of wheels 54, 56, 58, consecutively, disposed in direction of a longitudinal axis 52 of the vehicle, whose individual wheels are individually driven. Each one of the wheel pairs 54, 56, 58 are associated with two electric motors disposed in the longitudinal axis of the vehicle, connected with a diesel electric drive of which each, in turn, is operatively connected, via a universal joint shaft, with one of the wheels.

REFERENCE NUMERALS 2 universal joint shaft 36 drive device
4 main section 38 drive device
6 universal joint 40 output connection shaft
8 end section 42 output connection shaft
10 output connection shaft 44 bevel gearwheel
11 double arrow 46 bevel gearwheel
12 axis of rotation 48 bevel gearwheel
14 axis of rotation of 10 50 bevel gearwheel
16 bevel gearwheel 52 vehicle longitudinal axle
18 bevel gearwheel 54 wheel pair
20 end section 56 wheel pair
22 connection shaft 58 wheel pair
24 bevel gearwheel α angle
26 bevel gearwheel 60 drive device
30 end section 62 wheel
32 end section 64 drive input connection shaft
34 transverse plane 66 end section

The invention claimed is:

1. An individual wheel drive for individually suspended, spring mounted wheels of a vehicle, the individual wheel drive comprising:

a universal-joint shaft connecting an output connection shaft of a drive device with an input connection shaft of a drive wheel, the universal-joint shaft having one main section and two end sections, respectively, situated on ends of the universal-joint shaft, via a universal joint and rotationally coupled with an associated connection shaft, the universal-joint shaft having a permanent inclination, compensating an offset between the drive device and the wheels and a means for reducing a permanent deflection angle, determined by an inclination, a first end section (4), associated with the universal joint (6), and the connection shaft (10) are coupled, via a bevel wheel pair (16, 18), a deflection angle ($\alpha$) of which corresponds at least partly with the permanent deflection angle between the universal-joint shaft (2, 4) and the connection shaft (10) coupled therewith.

2. The individual wheel drive according to claim 1, wherein the connection shaft (40, 42) is located perpendicular to an inclination plane (34) of the universal-joint shaft (2), and the deflection angle of the bevel wheel pair (44, 46; 48, 50) is equal to 90 degrees.

3. The individual wheel drive according to claim 2, wherein the vehicle has at least two driving wheels and the universal-joint shafts, and each universal-joint shaft, associated with the respective driving wheel, is situated in a transverse plane (34), across a vehicle longitudinal axis and symmetrically, relative to a vertical longitudinal central plane of the vehicle and being outwardly and downwardly inclined, the output connection shafts (40, 42) of at least one of the associated drive devices (36, 38) and the bevel wheels (46, 50), located thereon, are substantially located in a transverse direction of the vehicle, offset by an amount (a) such that only one wheel of the bevel wheel pair (46, 50) engages the bevel wheel (44, 48) of the associated universal-joint shaft.

4. The individual wheel drive according to claim 3, wherein the drive devices (36, 38) are each electric motors which are electrically connected with a diesel electric drive line.

5. The individual wheel drive according to claim 3, wherein several driving wheel pairs (54, 56, 58) are consecutively disposed in a longitudinal direction of the vehicle.

6. The individual wheel drive according to claim 1, wherein at least a drive-side end section (30, 32) of the universal-joint shaft is connected with the associated connection shaft (40, 42) via the bevel wheel pair (44, 46; 48, 50) that bridges the deflection angle.

7. An individual wheel drive for an individually suspended, spring-mounted wheel (62) of a vehicle, the wheel drive comprising:
- a drive output connection shaft (10) having an axis of rotation (14) and being coupled to a drive device (60);
- a drive input connection shaft (64) being coupled to the spring-mounted wheel (62);
- a universal-joint shaft (2) having a main section (4), a first end section (8) and a second end section (66), the second end section (66) of the universal-joint shaft (2) being coupled to the drive input connection shaft (64), an axis of the universal-joint shaft (2) being at a permanent inclination with respect to an axis of the drive output connection shaft (10), enabling the drive device (60) and the drive output connection shaft (10) to be coupled and vertically offset from the wheel (62);
- a universal joint (6) rotationally coupling the first end section (8) of the universal-joint shaft (2) with the main section (4) of the universal-joint shaft (2);
- a beveled gear wheel pair (16, 18) comprising a first beveled gear wheel (16) and a second beveled gear wheel (18), for overcoming a permanent deflection angle ($\alpha$), which is determined by the permanent inclination of the axis of the universal-joint shaft (2) with respect to the axis of the drive output connection shaft (10); and
- the first beveled gear wheel (16) being fixed to the first end section (8) of the universal-joint shaft (2) and the second beveled gear wheel (18) being fixed to the drive output connection shaft (10), and the first beveled gear wheel (16) engaging the second beveled gear wheel (18) to drivingly couple the universal-joint shaft (2) and the drive output connection shaft (10) at the permanent deflection angle ($\alpha$).

* * * * *